US008670875B2

(12) United States Patent
Lo et al.

(10) Patent No.: US 8,670,875 B2
(45) Date of Patent: Mar. 11, 2014

(54) PLC FUNCTION BLOCK FOR AUTOMATED DEMAND RESPONSE INTEGRATION

(75) Inventors: George Lo, Plainsboro, NJ (US); Thomas Gruenewald, Somerset, NJ (US); Florian Ersch, Monmouth Junction, NJ (US); Swen Elpelt, East Windsor, NJ (US)

(73) Assignee: Siemens Corporation, Iselin, NJ (US)

( * ) Notice: Subject to any disclaimer, the term of this patent is extended or adjusted under 35 U.S.C. 154(b) by 235 days.

(21) Appl. No.: 13/103,392

(22) Filed: May 9, 2011

(65) Prior Publication Data

US 2012/0004786 A1 Jan. 5, 2012

Related U.S. Application Data

(60) Provisional application No. 61/359,889, filed on Jun. 30, 2010.

(51) Int. Cl.
*G05D 3/10* (2006.01)

(52) U.S. Cl.
USPC .......................................... 700/296; 705/412

(58) Field of Classification Search
None
See application file for complete search history.

(56) References Cited

U.S. PATENT DOCUMENTS

| 2001/0010032 A1* | 7/2001 | Ehlers et al. ........................ 702/62 |
| 2002/0162032 A1 | 10/2002 | Gundersen et al. |
| 2005/0228517 A1* | 10/2005 | Tomita ............................. 700/87 |
| 2009/0064103 A1* | 3/2009 | Shih ................................ 717/113 |
| 2009/0187499 A1* | 7/2009 | Mulder et al. ................... 705/30 |
| 2009/0240381 A1* | 9/2009 | Lane ............................... 700/296 |
| 2010/0070101 A1* | 3/2010 | Benes et al. ................... 700/296 |
| 2010/0088261 A1 | 4/2010 | Montalvo |
| 2010/0100253 A1* | 4/2010 | Fausak et al. ................. 700/295 |
| 2010/0141046 A1 | 6/2010 | Paik |
| 2010/0217550 A1* | 8/2010 | Crabtree et al. ................ 702/62 |
| 2011/0066300 A1* | 3/2011 | Tyagi et al. .................... 700/291 |
| 2011/0153110 A1* | 6/2011 | Drake et al. ................... 700/296 |
| 2011/0208369 A1* | 8/2011 | Yang et al. .................... 700/296 |

FOREIGN PATENT DOCUMENTS

WO 2009/072985 A1 6/2009

OTHER PUBLICATIONS

European Search Report dated Aug. 26, 2013

* cited by examiner

*Primary Examiner* — Kavita Padmanabhan
*Assistant Examiner* — Patrick Cummins
(74) *Attorney, Agent, or Firm* — Michele L. Conover

(57) ABSTRACT

Systems and methods are described that allow a Programmable Logic Controller (PLC) to receive Demand Response (DR) data and process the data in a PLC Function Block (FB). Embodiments provide a PLC demand response FB that solicits DR data and a demand response load manager FB that compares the DR data with predetermined demand constraints corresponding to electrical equipment. The demand constraints provide energy consumption strategies for buildings and factories.

8 Claims, 8 Drawing Sheets

PLC FUNCTION BLOCK FOR AUTOMATED DEMAND RESPONSE INTEGRATION

CROSS REFERENCE TO RELATED APPLICATIONS

This application claims the benefit of U.S. Provisional Application No. 61/359,889, filed on Jun. 30, 2010, the disclosure which is incorporated herein by reference in its entirety.

BACKGROUND OF THE INVENTION

The invention relates generally to process control. More specifically, the invention relates to interfacing a demand response system with a Programmable Logic Controller (PLC).

Residential and commercial buildings consume more than 70% of all electricity generated. Therefore, electricity consumption in buildings plays a major role in smart grid. Next to energy efficiency and renewable power generation, peak load reduction is an important goal for smart grid.

Demand Response (DR) is a way to change the electric usage by end-use customers from their normal consumption patterns in response to DR signals. The benefits are that by shedding electricity consumption during peak use hours the need for peaking power plants is reduced. Another benefit is the overall electricity consumption will be reduced when supply is short (e.g., renewable energy generation fluctuation, major equipment failure in the power grid, etc.).

DR manages customer consumption of electricity in response to supply conditions. DR mechanisms respond to explicit requests to shed load. DR involves curtailing power used or by starting on site generation which may or may not be connected in parallel with the grid. DR is a component of smart energy demand, which includes energy efficiency, home and building energy management, distributed renewable resources, and electric vehicle charging.

Current DR schemes are implemented through the use of dedicated control systems to shed loads in response to a request by a utility or market price conditions. Services (lights, machines, air conditioning) are reduced according to a preplanned load prioritization scheme during the critical time frames. An alternative to load shedding is on-site generation of electricity to supplement the power grid.

DR is typically used to reduce demand. Depending on the configuration of generation capacity, DR response may also be used to increase demand (load) at times of high production and low demand.

There are two types of DR—emergency demand response and economic demand response. Emergency DR is needed to avoid power outages. Economic DR is used to assist utilities manage daily system peaks.

Today's Networked Control System (NCS) is a Distributed Control System (DCS) whose components (process sensors, controllers, process actuators, etc.) are distributed using digital network technology. An NCS is a control system where control loops are closed through a real-time DCS. Process signals (process variables) from transmitters, sensors, etc., and control signals (control variables) to actuators, valves, etc., are exchanged among the components as information packages through a network.

What is needed is a method and system that provides an operational interface between a facility control system and a DR system.

SUMMARY OF THE INVENTION

The inventors have discovered that it would be desirable to have systems and methods that allow a Programmable Logic Controller (PLC) to receive Demand Response (DR) signals and process them in a PLC Function Block (FB). Embodiments provide a PLC demand response FB that solicits DR data and a load manager FB that compares the DR data with predetermined demand constraints corresponding to electrical loads. The demand constraints provide energy consumption strategies for buildings and factories.

One aspect of the invention provides a method for a Programmable Logic Controller (PLC) to control facility electrical equipment based on Demand Response (DR) data. Aspects according to the method include obtaining DR data from a Demand Response Application Server (DRAS), receiving the DR data from the DRAS, and parsing the received DR data into a DR event level and price.

Another aspect of the method is wherein obtaining DR data further comprises selecting a Uniform Resource Locator (URL) corresponding to the regional DRAS for the facility.

Another aspect of the method is generating a query based on an eXtensible Markup Language (XML) based schema which describes the data format for the DRAS.

Another aspect of the invention is a Programmable Logic Controller (PLC) demand response Function Block (FB) that includes an enabling input (EN) and an enabling output (ENO) for coupling with a PLC ladder rung for execution, a client application configuration module configured with a Demand Response Application Server (DRAS) regional Uniform Resource Locator (URL) and a demand response data update frequency wherein an embedded client application script communicates over a communications network with the DRAS and solicits demand response event data from the DRAS depending on the update frequency, a demand response data protocol receiver configured to receive current demand response event level (normal, medium, high) and level price data from the DRAS, and a demand response data writer configured to write the received data to event level and event price address registers.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
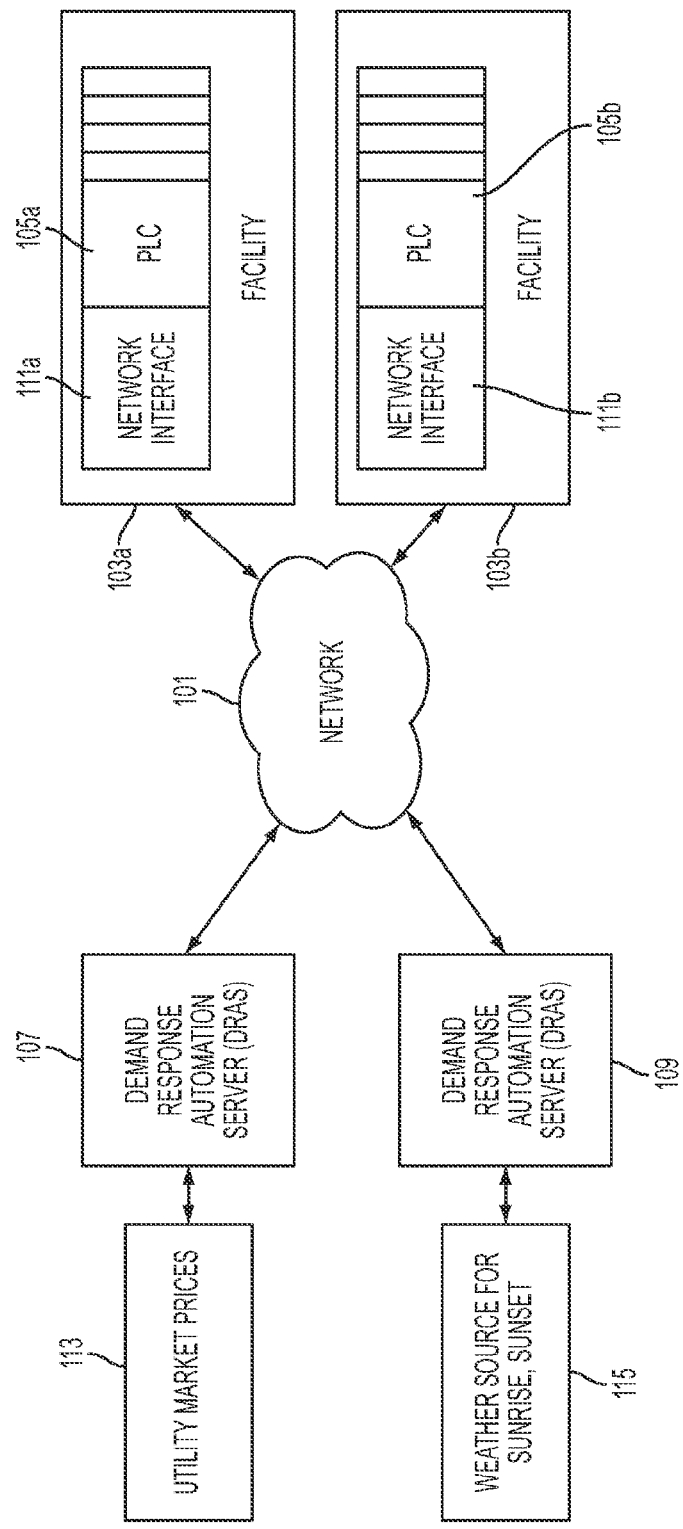
FIG. 1 is an exemplary communications network.

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items.

The terms "connected" and "coupled" are used broadly and encompass both direct and indirect connecting, and coupling. Further, "connected" and "coupled" are not restricted to physical or mechanical connections or couplings.

It should be noted that the invention is not limited to any particular software language described or that is implied in the figures. One of ordinary skill in the art will understand that a variety of software languages may be used for implementation of the invention. It should also be understood that some of the components and items are illustrated and described as if they were hardware elements, as is common practice within the art. However, one of ordinary skill in the art, and based on a reading of this detailed description, would understand that, in at least one embodiment, components in the method and system may be implemented in software or hardware.

Embodiments of the invention provide methods, system frameworks, and computer-usable media storing computer-readable instructions that allow a user to control power consumption for a facility based upon regional energy pricing and the environmental conditions at the facility location. Embodiments monitor the price of electrical energy supplied to facilities by their electric utility. The invention may be deployed as software as an application program tangibly embodied on a program storage device. The application code for execution can reside on a plurality of different types of computer readable media known to those skilled in the art.

Embodiments allow for a load shedding scheme to be configured for a facility. Predetermined loads controlled by a PLC may be shed or shifted depending on the facility's control system energy consumption, the current energy commodity market prices, and future energy market prices. PLCs control process equipment and machinery used in building, manufacturing and process control. Embodiments extend a PLC's reach to enable automated demand response.

Although exemplary embodiments are described herein with reference to particular network devices, architectures, and frameworks, nothing should be construed as limiting the scope of the invention.

FIG. 1 shows an overall distributed system view of the invention. A communications network 101 may be a single network or a combination of communications networks including any wireline, wireless, broadband, switched, packet or other type of network through which voice or data communications may be accomplished. For example, the Internet.

One or more facilities 103a, 103b (collectively 103) that employ PLCs 105a, 105b (collectively 105) access one or more Demand Response Automation Servers (DRASs) 107, 109 which host Demand Response (DR) data via the network 101. A PLC 105 is used to control facility 103 automation and electrical loads.

The DRASs 107, 109 provide energy data in an OpenADR alliance web service. DR programs are accepted as an effective industry solution for shedding or shifting user electric loads. The DR data is forwarded through the network 101 to subscribing clients. The DRASs 107, 109 offer a web service interface employing, for example, Simple Object Access Protocol (SOAP) with an XML (eXtensible Markup Language) or HyperText Markup Language (HTML) based type data exchange format where a DRAS client connects regularly for data. The format may include an XML based schema which describes the data format and uses a messaging pattern such as Message Exchange Pattern (MEP) to retrieve the DR data.

A regional power utility or Independent Service Operator (ISO) 113, 115 defines DR event levels and energy price data that are sent to the DRASs 107, 109. DR event levels and energy price are published at the DRASs 107, 109 up to 36 hours before an event level execution, which means there is time to plan accordingly. However, depending on the DR program, it is also possible that the reaction time for a DR event may be short (e.g., 15 minutes).

A PLC 105 comprises a processor, an operating system (OS), a data store, a communication bus, an external control connection (I/O) and a communications interface. The communications interface couples to a wired or wireless network interface 111a, 111b (collectively 111) for communication with the network 101. Each PLC typically includes I/O cards or modules which may comprise switched outputs and inputs, analog outputs and inputs, and configurable digital interfaces and is expandable regarding the number and type of I/O points. The network interface 111 may be a separate I/O card or may be part of the PLC 105. Other I/O configurations are possible. The I/O may couple directly or indirectly (using a building automation system) to loads and other facility devices for control.

The SIMATIC S7 is one exemplary PLC manufactured and sold by Siemens AG. PLCs are usually programmed with a conventional personal computer such as a PC, MACINTOSH or UNIX based workstation based software programming tool, for example, Siemens Step 7, and communicates with the PLC over wireline (guided) or wireless (unguided) communications media to download and store the program for execution. The software is used for programming, testing, and documentation. The software may run on a Microsoft Operating System (OS) or others. The programming environment may include macros and cross compilation to and from other programming languages such as BASIC, C, C++, C# and Java.

The PLC program can be created in different ways such as a Function Block Diagram (FBD) where an automation task is a graphical representation (graphical symbols) in accordance with DIN 40700/DIN 40719 symbols and comprise Organization Blocks (OB) that manage the PLC program and Programming Blocks (PB) that structure the control program; a Ladder Diagram (LD) where the program resembles a circuit diagram of the automation task; a Structured Text (ST) (similar to Pascal programming language) where the program comprises a sequence of commands (mnemonic codes) executed one after another; an Instruction List (IL) (similar to assembly language) and a Sequential Function Chart (SFC). These techniques emphasize the logical organization of operations.

Preferably, the PLC 105 communications interface 111 is secure and allows effective integration of stored data and external DRASs 107, 109 data such as utility market prices 113 and weather information 115 through a set of software Function Blocks (FBs).

Figure 2:
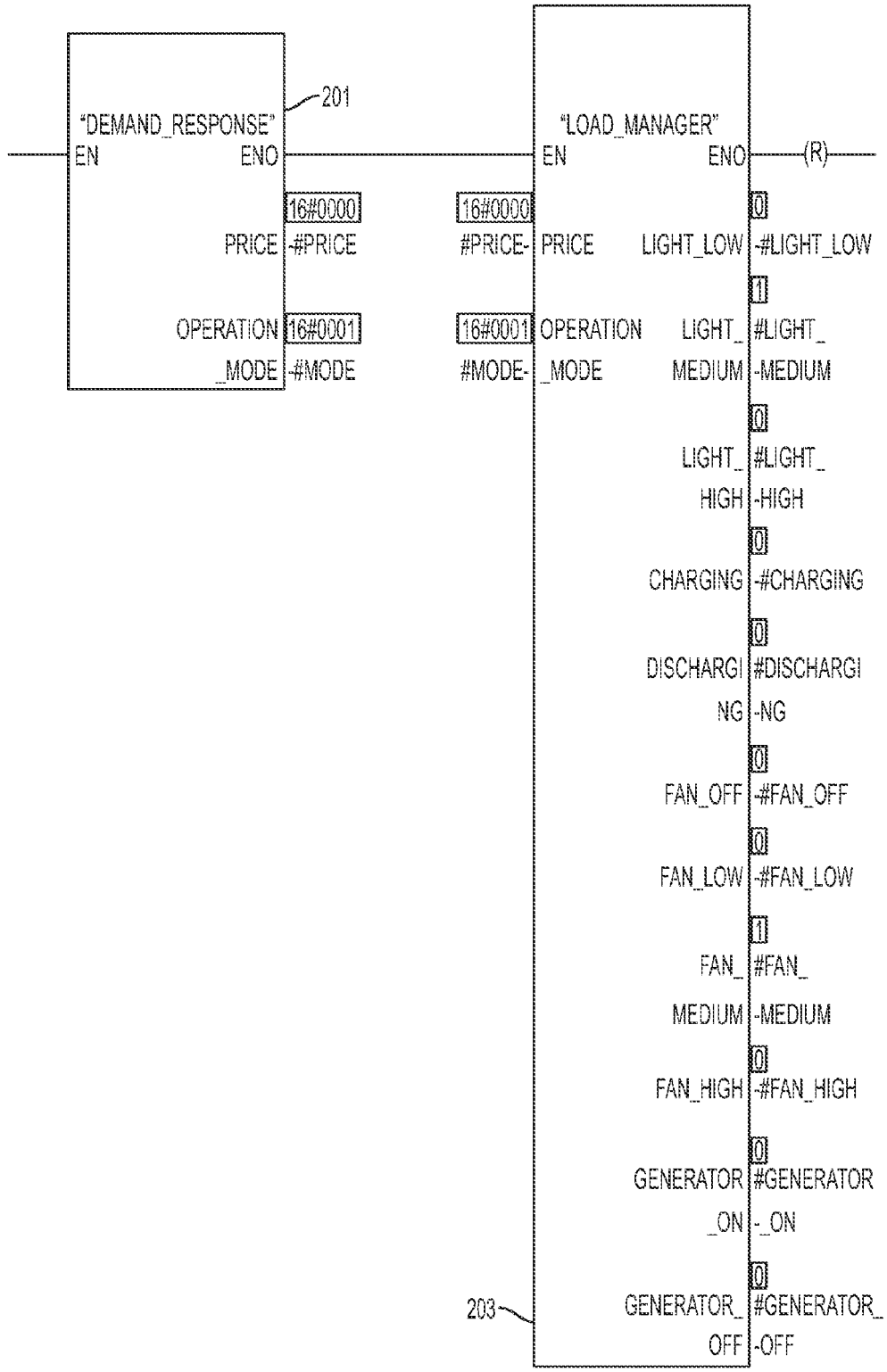
FIG. 2 is an exemplary Programmable Logic Controller (PLC) ladder rung showing a demand response Function Block (FB) and a demand response load manager FB according to the invention.
Figure 3A:
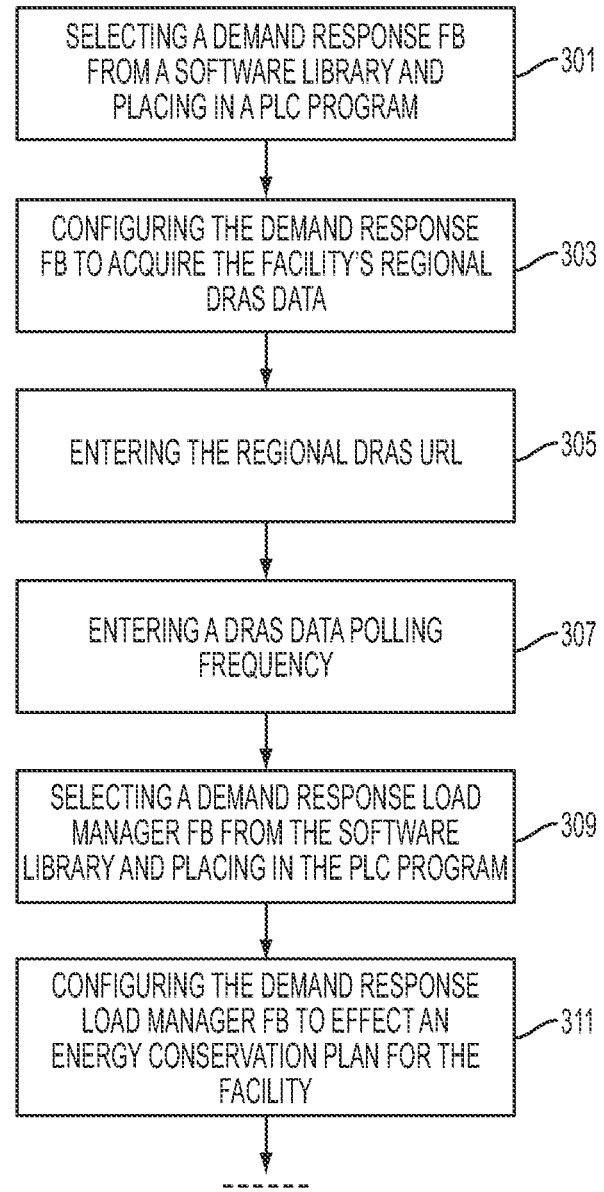
FIG. 3 is an exemplary method.
Figure 3B:
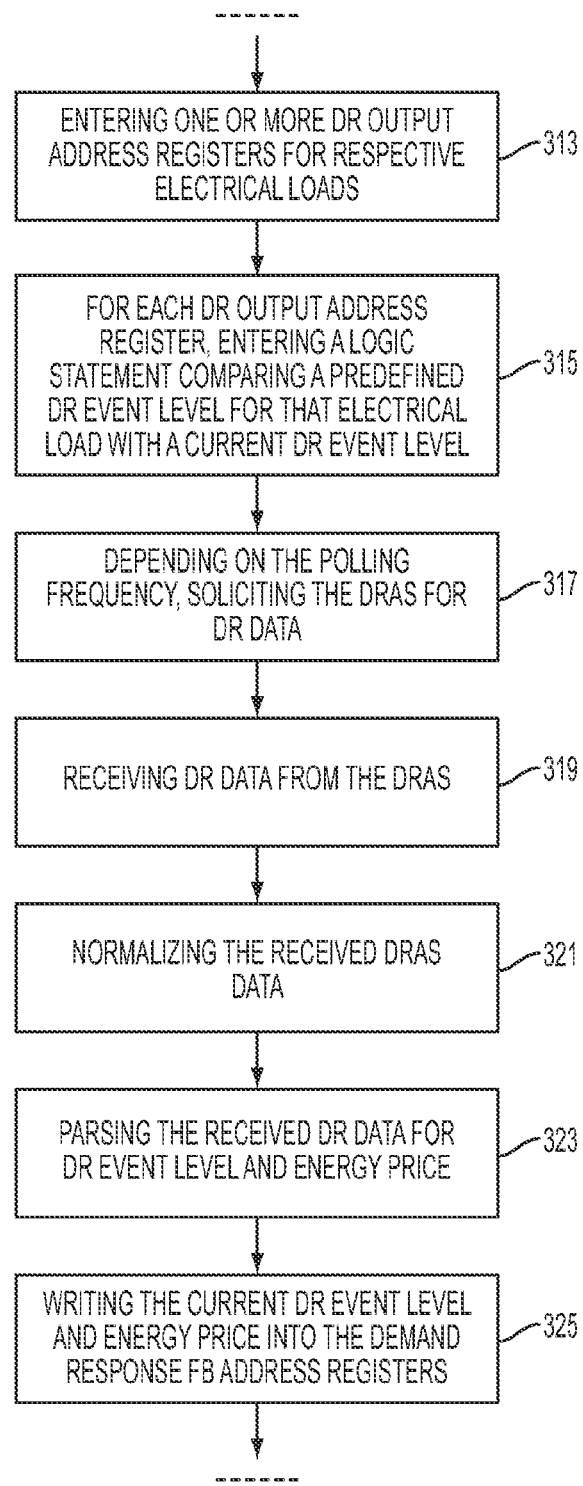
Figure 3C:
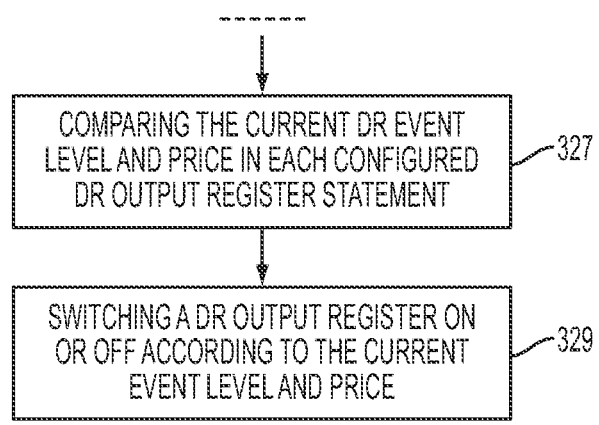
Figure 4:
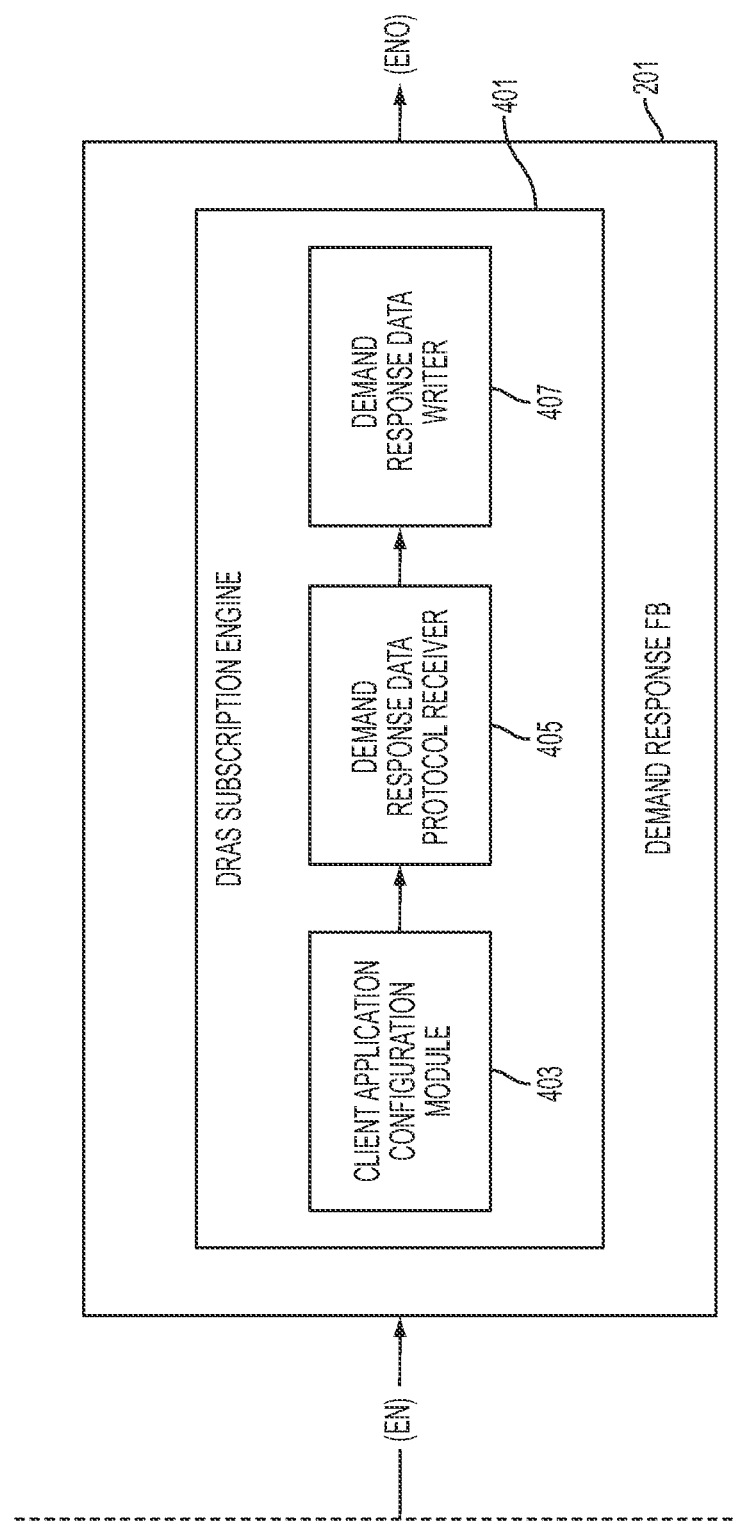
FIG. 4 is an exemplary demand response FB framework.
Figure 5:
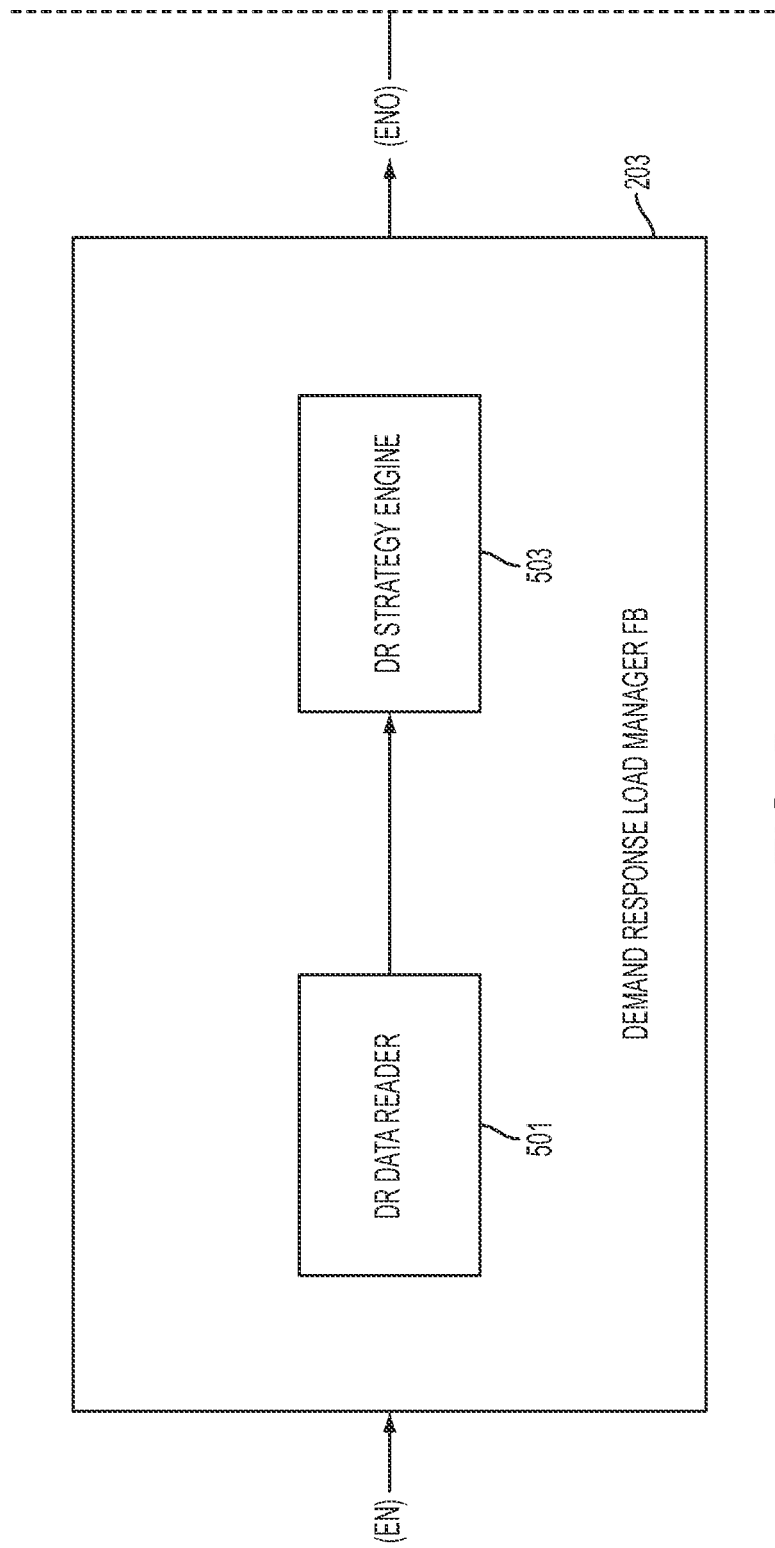
FIG. 5 is an exemplary demand response load manager FB framework.

FIG. 2 shows a screen view of a ladder rung that includes a demand response FB 201 coupled to a demand response load manger FB 203. FIG. 3 shows a method and FIGS. 4 and 5 show the FB frameworks. Embodiments integrate a DR client protocol into a PLC program using the demand response FB 201 that effect an energy use strategy using the demand response load manager FB 203.

The demand response FB 201 comprises an enabling input (EN) and an enabling output (ENO), and configurable DR address registers for energy price (#Price—16#0000) and event level (#Mode—16#0001) which may include start and end times. The PLC software programming engineering and configuration tool is opened and a user selects (drags and drops) a demand response FB 201 from the FB library and inserts it into a desired ladder rung under development. The demand response FB 201 is configured with a DRAS regional Uniform Resource Locator (URL) with whom the Demand Response contract is with and a DR data update frequency inputted by a user. The update frequency may be per unit time (every 30 minutes) or per PLC program execution cycle (steps 301, 303, 305, 307).

The demand response FB 201 employs an embedded client application script that communicates with and requests information from the DRASs 107, 109 depending on the update frequency and writes received data to the DR address registers.

The demand response load manger FB 203 comprises an enabling input (EN), an enabling output (ENO) and one or more assignable, configurable load address registers. In the illustrated example, the ENO resets the state of the memory bit M100.1 when the FB 203 successfully executes. The load address registers control assigned equipment via PLC I/O. The user selects a demand response load manager FB 203 from the FB library and couples it to the demand response FB 201 ENO (steps 309, 311, 313, 315).

The demand response FB 201 comprises a DRAS subscription engine 401 that solicits DR data from the DRASs 107, 109. A client application configuration module 403 allows the user to enter DRAS contact information in the form of a URL to contact the DRASs 107, 109 hosting the DR applications.

The client application configuration module 403 is a software module that acquires information from external systems, third parties and Web Services, and supports XML. The client application configuration module 403 allows each external system to be subscribed to, thereby exposing information. The client application configuration module 403 subscribes for information from the DRASs 107, 109 such as energy pricing 113 and environmental and weather conditions 115 where a facility 103 is located and knows each of the external systems a priori by URL or by search engine if unreachable or not known. The client application configuration module 403 is necessary to configure the URL string and DR request frequency (how often to poll the DRASs 107, 109 for data). The client application configuration module 403 programmatically requests all required DR information from the DRASs 107, 109.

The PLC 105 communicates with the DRASs 107, 109 over the network 101 using custom or standard Internet languages and protocols, and may involve scripting languages including HTML (Hypertext Markup Language), dynamic HTML (DHTML), Microsoft VBScript (Visual Basic Scripting Edition), Jscript, ActiveX, XML and Java.

The DR data that are sent from the DRAS 107, 109 to the DRAS clients (devices) follow the proposed standard developed at the Lawrence Berkeley National Laboratory Demand Response Research Center. The OpenADR standard defines two ways in which to interface with DRAS: 1) via a Representational State Transfer (REST) web service or 2) via a SOAP web service. The REST web service provides DRAS clients with a simple method for retrieving DRAS event information over the Internet, while the SOAP web service contains the same information, but uses the more structured SOAP protocol.

Utilities offer different programs for their customers. For example, Large Commercial and Industrial Demand Response (Demand Bid, Capacity Bid, Peak Choice, Participating Load) and Price Response Notification and Automation (Retail: Critical Peak Pricing) dependent on the program and the content availability of the protocol may vary.

Data from the DRAS 107, 109 is transport in an XML format. For example:

```
<?xml version="1.0" encoding="UTF-8" standalone="yes"?>
<p:listOfEventState xsi:schemaLocation="http://openadr.lbl.gov/src/1/EventState.xsd"
xmlns:p="http://www.openadr.org/DRAS/EventState" xmlns:xsi="http://www.w3.org/2001/XMLSchema-
instance">
    <p:eventStates offLine="false" testEvent="false" drasName="Akuacom 5.0" schemaVersion="1.0"
eventStateID="1985996601" drasClientID="client-1" eventIdentifier="110114-165130"
eventModNumber="1" programName="DBP DA">
        <p:simpleDRModeData>
            <p:EventStatus>ACTIVE</p:EventStatus>
            <p:OperationModeValue>HIGH</p:OperationModeValue>
            <p:currentTime>11791.012</p:currentTime>
            <p:operationModeSchedule>
                <p:modeSlot>
                    <p:OperationModeValue>MODERATE</p:OperationModeValue>
                    <p:modeTimeSlot>0</p:modeTimeSlot>
                </p:modeSlot>
                <p:modeSlot>
                    <p:OperationModeValue>HIGH</p:OperationModeValue>
                    <p:modeTimeSlot>3600</p:modeTimeSlot>
                </p:modeSlot>
                <p:modeSlot>
                    <p:OperationModeValue>MODERATE</p:OperationModeValue>
                    <p:modeTimeSlot>7200</p:modeTimeSlot>
                </p:modeSlot>
                <p:modeSlot>
                    <p:OperationModeValue>HIGH</p:OperationModeValue>
                    <p:modeTimeSlot>10800</p:modeTimeSlot>
                </p:modeSlot>
                <p:modeSlot>
                    <p:OperationModeValue>MODERATE</p:OperationModeValue>
                    <p:modeTimeSlot>14400</p:modeTimeSlot>
                </p:modeSlot>
                <p:modeSlot>
                    <p:OperationModeValue>HIGH</p:OperationModeValue>
                    <p:modeTimeSlot>18000</p:modeTimeSlot>
                </p:modeSlot>
                <p:modeSlot>
```

```xml
            <p:OperationModeValue>MODERATE</p:OperationModeValue>
            <p:modeTimeSlot>21600</p:modeTimeSlot>
        </p:modeSlot>
        <p:modeSlot>
            <p:OperationModeValue>HIGH</p:OperationModeValue>
            <p:modeTimeSlot>25200</p:modeTimeSlot>
        </p:modeSlot>
    </p:operationModeSchedule>
</p:simpleDRModeData>
<p:drEventData>
    <p:notificationTime>2011-01-14T16:52:59.000-08:00</p:notificationTime>
    <p:startTime>2011-01-18T12:00:00.000-08:00</p:startTime>
    <p:endTime>2011-01-18T20:00:00.000-08:00</p:endTime>
</p:drEventData>
<p:customData/>
    </p:eventStates>
</p:listOfEventState>.
```

After parsing and normalization, the received data from a DRAS 107, 109 changes event levels in a predefined interval using a Demand Bid Program (DBP):
Signal Entries Program: DBP DA, Event: 110114-165130, Comm Dev: client-1 Time Signal Value 01/17/11 21:00:00 pending on
01/18/11 12:00:00 mode moderate
01/18/11 13:00:00 mode high
01/18/11 14:00:00 mode moderate
01/18/11 15:00:00 mode high
01/18/11 16:00:00 mode moderate
01/18/11 17:00:00 mode high
01/18/11 18:00:00 mode moderate
01/18/11 19:00:00 mode high.

The following XML shows a message for a Critical Peak Pricing (CPP) event:

The data are received and normalized, and the values (time, event level (mode), price) are stored in the assigned PLC DR address registers. The client application configuration module 403 includes a configurable DRAS 107, 109 polling period. During each PLC cycle when the demand response FB 201 is executed, if the polling period has expired, the demand response FB 201 will solicit the DRAS 107, 109 to check for new DR data. If new DR data is available, the demand response FB 201 receives a new data message.

A DR signal may contain: 1) DR event data which may include price and/or load shed/shift levels; 2) a schedule of DR event and business information which is a date and time that specifies when a DR event occurs and when the information related to the DR event is valid and may be a single calendar event or a schedule (e.g., a schedule of prices wherein different timeslots during a DR event period represent different prices); 3) ancillary data that may aid the DR

```xml
<?xml version="1.0" encoding="UTF-8" standalone="yes"?>
<p:listOfEventState xsi:schemaLocation="http://openadr.lbl.gov/src/1/EventState.xsd"
xmlns:p="http://www.openadr.org/DRAS/EventState" xmlns:xsi="http://www.w3.org/2001/XMLSchema-instance">
    <p:eventStates offLine="false" testEvent="false" drasName="Akuacom 5.0" schemaVersion="1.0"
eventStateID="1985996835" drasClientID="clir.f" eventIdentifier="110118-165641" eventModNumber="1"
programName="CPP">
        <p:simpleDRModeData>
            <p:EventStatus>FAR</p:EventStatus>
            <p:OperationModeValue>NORMAL</p:OperationModeValue>
            <p:currentTime>-75596.862</p:currentTime>
            <p:operationModeSchedule>
                <p:modeSlot>
                    <p:OperationModeValue>NORMAL</p:OperationModeValue>
                    <p:modeTimeSlot>0</p:modeTimeSlot>
                </p:modeSlot>
            </p:operationModeSchedule>
        </p:simpleDRModeData>
        <p:drEventData>
            <p:notificationTime>2011-01-18T16:56:48.000-08:00</p:notificationTime>
            <p:startTime>2011-01-19T14:00:00.000-08:00</p:startTime>
            <p:endTime>2011-01-19T18:00:00.000-08:00</p:endTime>
            <p:eventInfoInstances>
                <p:eventInfoTypeID>PRICE_MULTIPLE</p:eventInfoTypeID>
                <p:eventInfoName>cpp_price</p:eventInfoName>
                <p:eventInfoValues>
                    <p:value>1.36229</p:value>
                    <p:timeOffset>0</p:timeOffset>
                </p:eventInfoValues>
            </p:eventInfoInstances>
        </p:drEventData>
        <p:customData/>
    </p:eventStates>
</p:listOfEventState>.
``` logic in determining how to respond to a DR event (e.g., source of energy—green power); and 4) simplified DR event data which is an alternative representation of DR event data that allows a wider range of automation systems and load controllers to respond to DR events.

A demand response protocol receiver 405 receives data returned from the DRAS 107, 109 (steps 317, 319). The received DR data is converted, if required, using a normalizer to a compatible PLC format and is parsed to retrieve DR level data in accordance with the user/DRAS contract (steps 321, 323). The DR data may comprise the current DR event level (normal, medium, high) and energy cost. For example, during 1:00-3:00 PM the event level is medium, during 3:00-5:00 PM the event level is high, during 5:00-7:00 PM the event level is medium and after 7:00 PM the event level is normal. A DR level describes how much load may be curtailed. Normal is business as usual/no curtailment, Moderate is medium curtailment and High means high energy curtailment. The amount for each of these levels is described in the contract with the Utility/ISO/Aggregator and different for each customer. Each DR event includes a time interval (e.g., from 1:00-2:00 PM: level=moderate, price=$1/kWh; from 2:00-4:00 PM: level=high, price=$5/kWh; from 4:00-6:00 PM: level=moderate, price=$2/kWh). Dependent on the offered program the user can choose what the trigger will be (price/level or both).

The demand response protocol receiver 405 forwards the information to a demand response protocol writer 407 which writes the formatted DR data in the DR address registers (step 325).

The demand response load manger FB 203 DR data reader 501 reads the DR data from the demand response FB 201 DR address registers and compares the DR data in a demand response strategy engine 503 (step 327). The demand response strategy engine 503 is a user configuration that specifies predetermined load constraints for each load address register. Each load address register is controlled by a logic statement that compares a DR event level with a configured (predefined) DR event level for that specific equipment.

The demand response load manger FB 203 user configuration specifies the address registers that control electrical load shedding, load shifting and/or onsite generation. For example, lighting (#Light_Low, #Light_Medium, #Light_High), battery charging (#Charging, #Discharging), ventilation fan (#Fan_Off, #Fan_Low, #Fan_Medium, #Fan_High) and generator (#Generator_On, #Generator_Off) (FIG. 2).

For each selected load, a corresponding DR event level is assigned. The user decides whether an event level or the energy price for that level is compared. The user configuration may be created, for example, using the Standard Template Library (STL).

The DR strategy engine 503 in conjunction with the user configuration determines which loads are shed or sequenced on when an event level changes, or if the cost of energy reaches a predetermined threshold (step 329).

One or more embodiments of the present invention have been described. Nevertheless, it will be understood that various modifications may be made without departing from the spirit and scope of the invention. Accordingly, other embodiments are within the scope of the following claims.

What is claimed is:

1. A programmable logic controller (PLC) comprising:
a processor;
a plurality of external connection input/output modules in communication with the processor and with a plurality of electrical equipment units;
a network communications interface in communication with the processor;
a data store in communication with the processor and comprising a current event level address register, an event price address register and at least one set of load address registers representing a set of demand response event levels for one of the electrical equipment units;
computer useable media storing computer readable instructions that, when executed by the processor, implement a ladder diagram PLC program including a ladder rung with:
a demand response Function Block (FB) selected from a PLC function block library containing a plurality of standard PLC function blocks, the demand response FB being connected within the ladder rung via a first enabling input (EN) and a first enabling output (ENO), the demand response FB comprising:
a client application configuration module configured with a Demand Response Application Server (DRAS) regional Uniform Resource Locator (URL) and a demand response data update frequency, the client application configuration module comprising an embedded client application script that communicates via the network communications interface with the DRAS and solicits demand response event data from the DRAS according to the update frequency;
a demand response data protocol receiver for receiving current demand response event levels and level price data from the DRAS via the network communications interface; and
a demand response data writer for writing the current demand response event level to the current event level address register and writing the level price data to the event price address register; and
a demand response load manager FB selected from the PLC function block library, the demand response load manager FB being connected within the ladder rung via a second enabling input (EN) and a second enabling output (ENO), the demand response load manager FB comprising:
a demand response data reader for reading the current demand response event level from the current event level address register, and the level price data from the event price address register; and
a demand response strategy engine comprising, for each one of the electrical equipment units, a logic statement configured to compare at least one of the current demand response event level and the level price data for the one electrical equipment unit with predefined levels for the one electrical equipment unit, and, based on the comparing, to specify one address register of the set of load address registers representing event levels for the one electrical equipment unit, for causing the input/output modules to control the electrical equipment unit to shed or to sequence on loads.

2. The PLC according to claim 1 wherein the client application script solicits demand response event data from the DRAS via a query based on an XML based schema which describes the data format for the DRAS.

3. The PLC according to claim 1 wherein the current demand response event levels include normal, medium and high designations.

4. The PLC according to claim 1 wherein the current demand response event levels further comprise start and end times for an event level.

5. The PLC according to claim 1 wherein specifying one of the plurality of load address registers representing event levels for the one electrical equipment unit further comprises comprising setting the register as either on or off depending on the outcome of the comparing.

6. The PLC according to claim 1 wherein the demand response data protocol receiver parses the demand response data to retrieve the demand response event level and level price, and converts the data to a compatible PLC format.

7. The PLC according to claim 1 wherein the update frequency may be per unit time or per PLC program execution cycle.

8. The PLC according to claim 1 wherein the embedded client application script communicates with the DRAS using at least one scripting language selected from the group consisting of: HTML (Hypertext Markup Language), dynamic HTML (DHTML), Microsoft VBScript (Visual Basic Scripting Edition), Jscript, ActiveX, XML and Java.

\* \* \* \* \*